Dec. 12, 1967 D. A. STUKINS 3,357,573
CRANES
Filed Nov. 8, 1965 6 Sheets-Sheet 1

Dec. 12, 1967   D. A. STUKINS   3,357,573
CRANES
Filed Nov. 8, 1965   6 Sheets-Sheet 3

United States Patent Office 3,357,573
Patented Dec. 12, 1967

3,357,573
CRANES
Derek Allpress Stukins, Horsham, Sussex, England, assignor to Century Fabrications 100 Limited, Partridge Green, Sussex, England, a British company
Filed Nov. 8, 1965, Ser. No. 506,673
Claims priority, application Great Britain, Nov. 9, 1964, 45,682/64
6 Claims. (Cl. 212—49)

ABSTRACT OF THE DISCLOSURE

A vehicle is used to carry a tower crane form superstructure to a site. At the side the superstructure is set on the ground and the vehicle is lifted up and supported on one side of the superstructure to counterbalance the load, which is on the other side. The vehicle turns with the crane and the load about a vertical axis.

---

This invention relates to cranes.

According to the invention, there is provided apparatus comprising a tower crane form load-carrying structure coupled to a vehicle which can be used to transport the load-carrying structure, means on the vehicle for causing the load-carrying structure to be supported, positioned substantially wholly to one side of an upright axis of rotation for the load-carrying structure, by the ground and the vehicle to be raised from the ground and supported by the load-carrying structure so as to act as a counter-weight for the load-carrying structure as thus supported, means on the vehicle for turning the supported load-carrying structure, with the vehicle raised off the ground and acting as a counterweight, about said upright axis, and adjustable levelling means to ensure that said upright axis is vertical.

According to the invention, there is also provided apparatus comprising a tower crane form load-carrying structure, a load carried thereby, a vehicle which can be used to carry the load-carrying structure for the purpose of travel but is instead raised off the ground, being carried by the load-carrying structure, being positioned substantially wholly to one side of an upright axis of rotation for the latter and effective as a counter-weight for the latter, means for turning the load-carrying structure, the vehicle and the load about said upright axis, whilst both the vehicle and the load are carried by the load-carrying structure and are clear of the ground, and adjustable levelling means to ensure that said upright axis is vertical.

In apparatus according to the invention the load-carrying structure may be a tower crane or a jib-crane or it may be a mechanical digger.

Preferably the load-carrying structure can be turned, as aforesaid, through 360° about the vertical axis. Furthermore, motive means of the vehicle of the apparatus, which vehicle is preferably a tractor but it could be another type of vehicle, may be arranged to supply motive power for operating the load-carrying structure and the means for turning this structure about said vertical axis, in addition to supplying the motive power for the vehicle when the latter is used to transport the load-carrying structure.

In order that the invention may be more fully understood reference will now be made by way of example to the accompanying drawings in which FIGURES 1 to 3 illustrate one embodiment thereof in which the load-carrying structure is a tower crane, and FIGURES 4 and 5 illustrate two further embodiments thereof. In the drawings:

Figure 1:
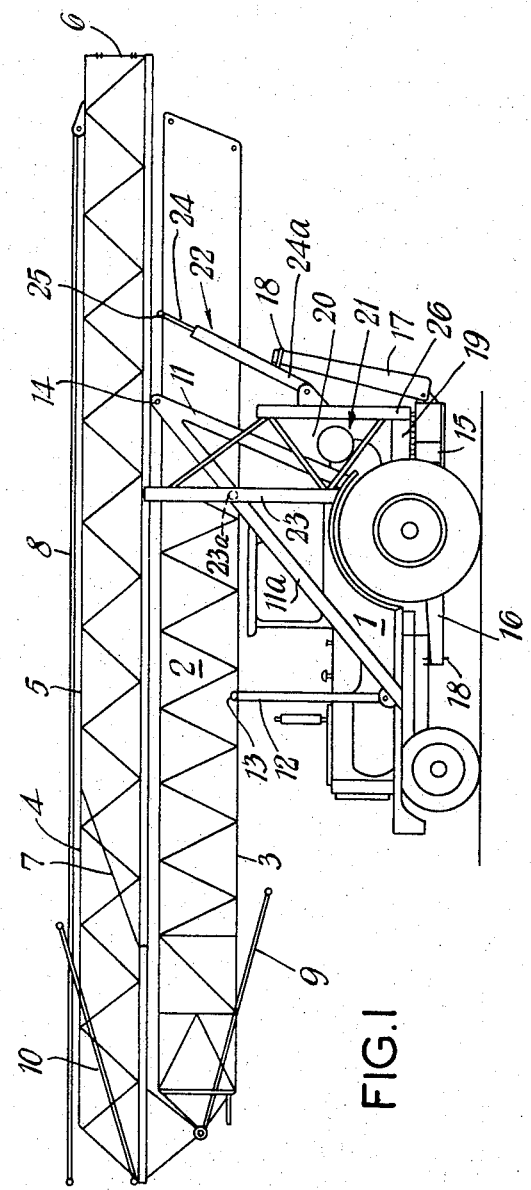
FIGURE 1 shows a tractor carrying a folding jib tower crane in a position suitable for transporting the crane.

Referring to the drawings, the apparatus shown in FIGURE 1 comprises a tractor 1 on which is mounted a folding jib tower crane 2. The crane 2 has a tower 3, which may be telescopic but which is not shown as such in the drawing, and a side-folded jib consisting of parts 4 and 5. The parts 4 and 5 are hinged together at their ends 6. The front of the part 5 is indicated at 7. Coupling rods 8 to 10 are provided on the crane 2. These rods, each of which is pivotally secured at one end to the crane 2, are used in the erection of the crane as will be described presently. The crane 2 is supported on the tractor 1 by means of girder structure secured to the tractor and comprising the parts 11, 11a, and 12. When it is being transported by the tractor 1, the crane 2, has its tower 3 connected to the top 13 of the part 12. The tower 3 is also pivotally connected to the girder structure at the junction 14 of the parts 11 and 11a.

Figure 3:
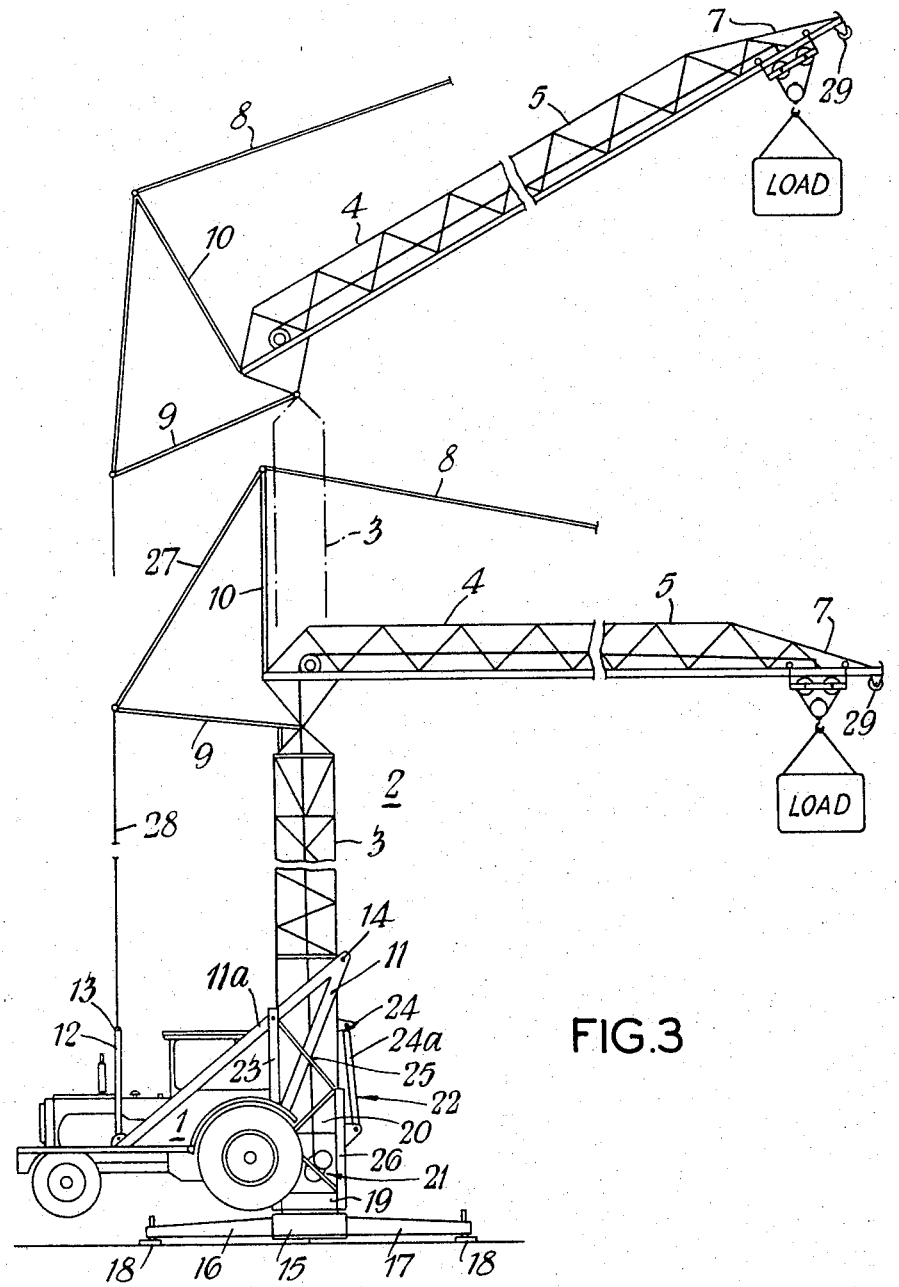
FIGURE 3 shows the crane in its operational position.
Figure 6:
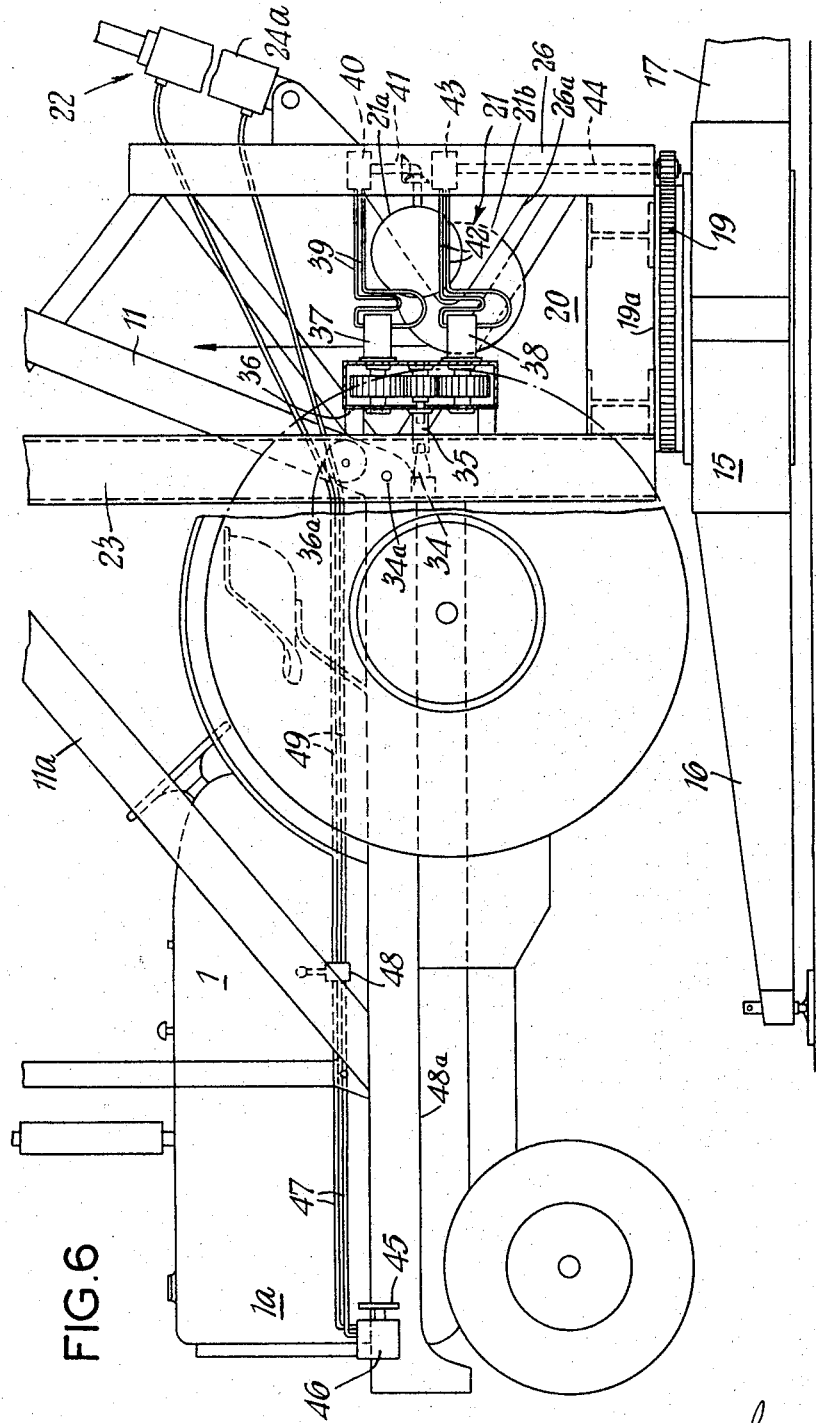
FIGURE 6 is an enlarged fragmentary view of FIGURE 3 showing motive means of the apparatus.

The tractor 1 also carries a base support for the tower crane 2, this base support comprising a central part 15 and arms 16 and 17. The arm 17 is hinged to the central part 15 so that during transportation of the crane 2 it can be in the position shown. Jacks 18 are provided on the ends of the arms 16 and 17. On the central part 15 of the base support there is mounted a slewing ring 19 having a toothed part fixed to part 15 and a turntable 19a rotatably mounted by bearings on the toothed part, on which part 19a is in turn fixedly mounted a base section 20 of the tower 3 of the crane 2. In this base section 20 there is mounted a winch assembly 21 for raising and lowering a load, as indicated in FIGURES 3 and 6. The tractor 1 and the base section 20 can be displaced in the vertical direction relative to one another under the action of a cylinder and piston ram device 22, use being made of a guide 23 to guide this displacement as indicated in FIGURE 6. The ram device 22 has a piston 24 and a cylinder 24a which is movable, for example hydraulically, into and out of the cylinder 24a.

As shown in FIGURE 6, guides 23 are of channel section, their channels facing towards one another, and located between them is the rigid girder structure comprising parts 11a, 11 and a member of the tractor, e.g. member 48a, which rigid girder structure has mounted on its part 11 a pair of rollers 36a which run on the back edges of the respective guides 23, and mounted on its part 11a a pair of rollers 23a (located as shown in FIGURE 1) which run against the front edges of the respective guides 23. By means of these four rollers, there can be relative vertical movement, but no other, between the base section 20 and the rigid girder structure associated with the tractor 1.

Figure 2:
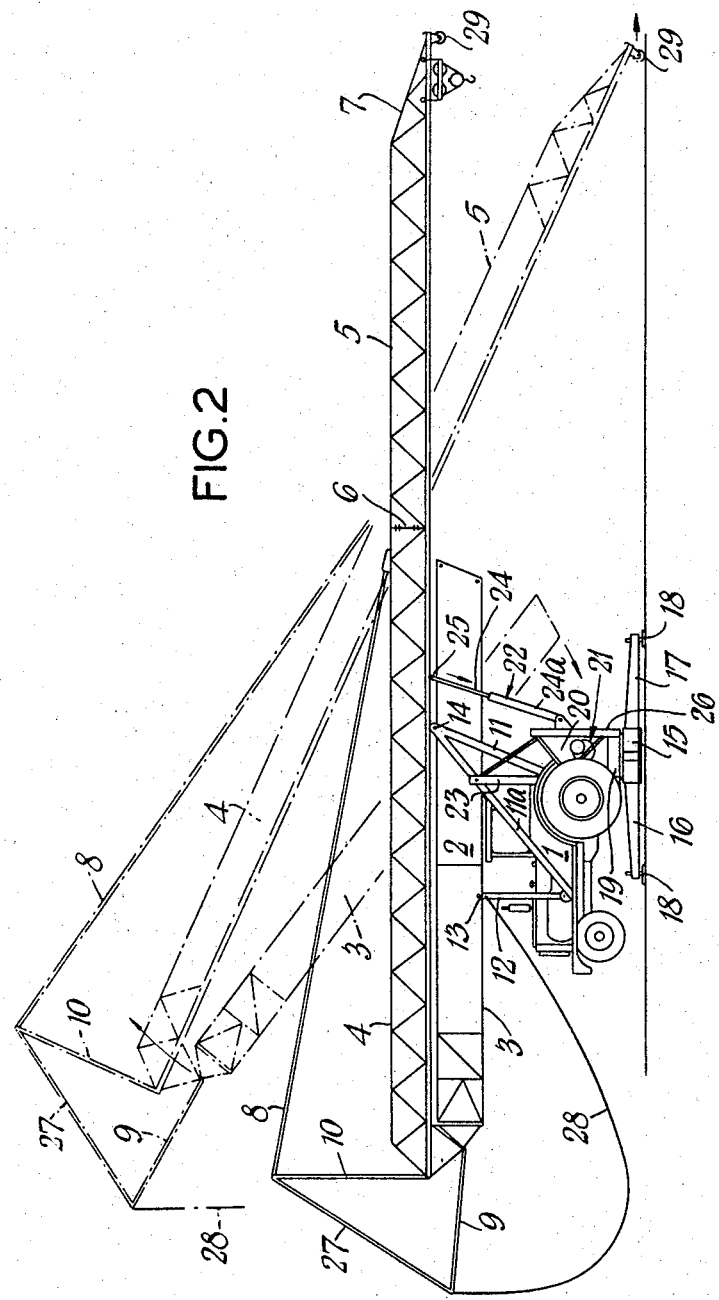
FIGURE 2 shows a stage in the erection of the crane.

To erect the crane 2, the jib 4, 5 is first unfolded, see FIGURES 1 and 2, and the ram device 22 is operated to cause the piston 24 to be pushed out of the cylinder 24a. The outer end of the piston 24 is pivotally secured at a point 25 to the tower 3 of the crane 2 which by means of connections 13 and 14 is at this time rigid with the tractor and its girder structure, and the end of the cylinder 24a away from the piston 24 is pivotally secured to a support member 26 of the base section 20. Thus, as the piston 24 moves out of the cylinder 24a, it pushes against the tower 3 which at this time is still secured in the horizontal position to the tractor 1, with the result that the base section 20 moves downwards relatively to the tractor 1 and with it the base support which is thus forced down to the ground. Once the base support is on the ground the arm 17 is brought to its operative position as shown in FIGURES 2 and 3 and the jacks 18 are adjusted until contact is made between the lower surface of each jack and the ground. Further movement of the piston 24 out of the cylinder 24a will cause the tractor 1 to be raised from the ground, as shown in FIGURE 2. The tractor 1 is then secured against further displacement relative to the base section 20, for example, by means of locking pins 34a inserted through aligned apertures in the guide 23 and in the tractor 1. The jacks 18 may be further adjusted, if necessary, to level the base section 20. Next, the rods 8, 9 and 10, and a further rod 27, are coupled together in the manner shown in FIGURE 2 and the joined ends of the rods 9 and 27 have connected to them a loose cable 28 which is connected at its other end to the top of the part 12 on the tractor 1. Also, a nose wheel 29 is provided at the underside of the outer end of the part 5 of the unfolded jib.

At this time the whole apparatus is rigid. Junction 13 is then released allowing junction 14 to act as a pivot for the tower relative to the remainder (tractor and base section).

With the tower 3 of the crane 2 disconnected from the top 13 of the part 12, the ram device 22 is again operated, this time in the opposite sense so that the piston 24 is moved back into the cylinder 24a. As a result, the tower 3 pivots about the point 14 towards the vertical and the unfolded jib tilts over until its nose wheel 29 engages the ground. This part-erected condition is illustrated in FIGURE 2 in chain lines. When the piston 24 is moved sufficiently into the cylinder 24a, the tower 3 has swung into a vertical position in which it is secured to the base section 20. During the raising of the tower 3 to the vertical position, the nose wheel 29 runs along the ground until the slack in the cable 28 is taken up, at which time the jib is raised from the ground and swung away from the tower 3. The final angle between the jib and the tower may be about 90°, or greater than this as shown in FIGURE 3. Finally the tower may be extended in height in the usual manner.

The tower 3, the jib 4, 5, the base section 20 and the tractor 1 can all be turned through 360° by operation of the slewing ring 19, about the vertical axis which passes through the slewing ring 19, whilst the base support 15, 16, 17 remains stationary. The tractor 1 acts as a counterweight for the crane, wholly or partially counterbalancing the weight of a load carried by the crane.

The engine of the tractor 1 may be utilised to operate both the slewing ring 19 and the winch assembly 21, and also the ram device 22. As illustrated in FIGURE 6, this may be achieved as follows. At the rear of the tractor 1 there is provided a power take-off shaft 34 which is connected to the tractor engine 1a, such a shaft being a standard fitment on some tractors. This power take-off shaft 34 is coupled through a standard telescopic connecting shaft 35 to a gear box 36 which is mounted on tractor 1 and accommodated in the base section 20 of the crane. Through this gear box 36 the shaft 34 is arranged to drive two hydraulic pumps 37 and 38. The pump 37 is connected via tubes 39 to a hydraulic motor 40 which has a driving shaft 41 coupled by a gear box 21a to the winch assembly 21 to drive the drum 21b of the latter, which is mounted together with the gear box on a pair of supporting plates 26a carried on respective support members 26. The pump 38 is connected via tubes 42 to another hydraulic motor 43 which has a driving shaft 44 coupled to the slewing ring 19 to drive the base section 20 round on the latter. The gear box 36 affords selective connection of the pumps 37 and 38 to the connecting shaft 35 and thus to the power take-off shaft 34, so that the tractor engine 1a can be utilised as required to operate the slewing ring 19 and the winch assembly 21.

For the operation of the ram device 22, the front end of the crank shaft 45 of the tractor engine 1a is coupled to a further hydraulic pump 46 which is connected via tubes 47, a valve device 48 and further tubes 49 to the ram device 22. The valve device 48 controls the direction of flow of operating fluid to the ram device 22 according as the piston (24) thereof is to be pushed out of, or withdrawn into, the cylinder (24a) of the ram device.

Figure 4:
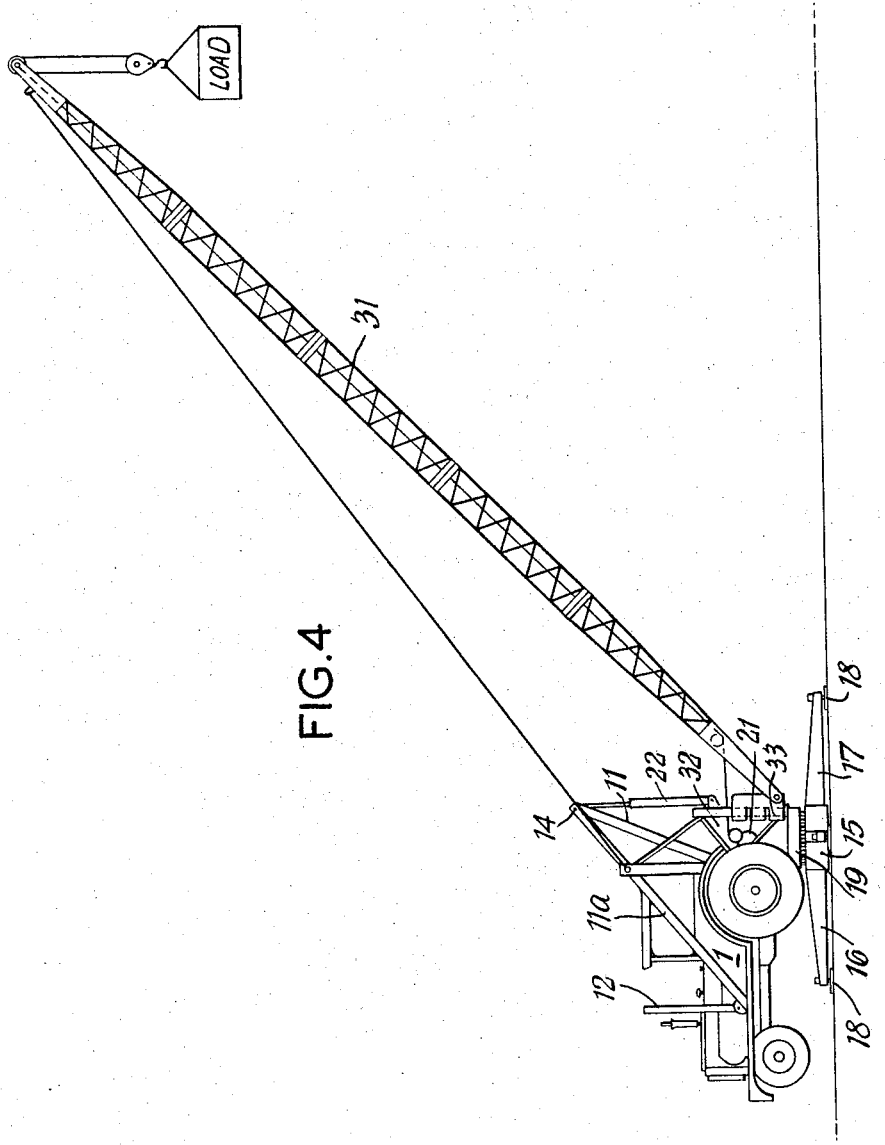
FIGURES 4 and 5 show respectively in their operational position a jib-crane and a mechanical digger each of which is coupled to a tractor which can be used to transport them.
Figure 5:
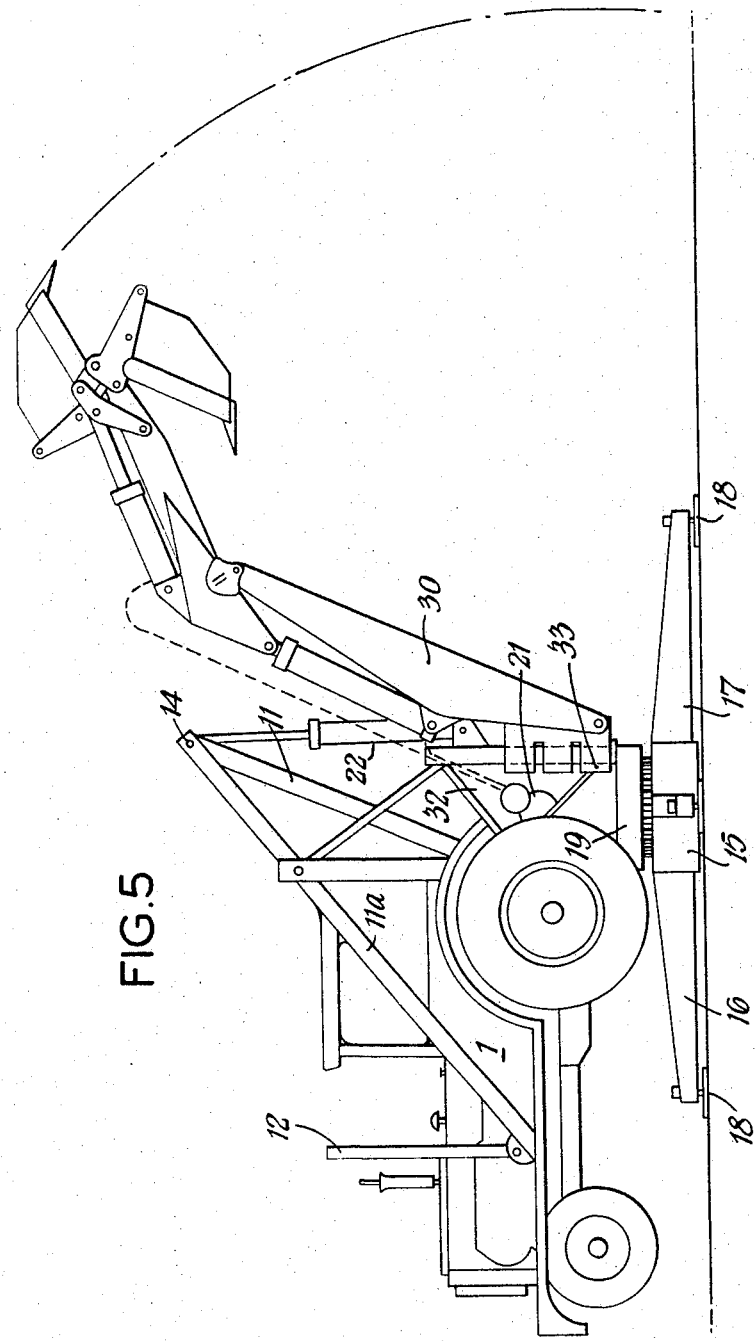

The invention may be applied to other load-carrying structures, for example, jib-cranes and mechanical diggers, and its application to a jib-crane and a mechanical digger is illustrated in FIGURES 4 and 5 respectively. In these latter figures a mechanical digger 30 or a jib-crane 31 replaces the tower crane shown in FIGURES 1 to 3. In each of these applications the ram device 22 of the apparatus in FIGURES 1 to 3 is reconnected at the top to point 14, as shown, to effect relative displacement between the rigid girder structure 11, 11a, 48a of the tractor 1 and a base section 32 which is the tower crane base section 20 with the addition of a bracket 33 and has provided therein either a winch device 21 (FIGURE 4) for the jib-crane as for the tower crane, or a controllable hydraulic pump 21 (FIGURE 5) for the mechanical digger, the device or pump 21 being mounted as shown in FIGURE 6. The jib-crane 31 can be dismantled into sections for transportation by the tractor 1, while the mechanical digger 30 is secured for transportation in a position in which its shovel is raised from the ground. In all other respects, the apparatus of FIGURES 4 and 5 corresponds to the apparatus of FIGURES 1 to 3.

What I claim is:

1. Apparatus comprising a tower crane form load-carrying structure, a vehicle which can be used to transport the load-carrying structure, means coupling the load-carrying structure to the vehicle, means on the vehicle for causing the load-carrying structure to be supported by the ground and the vehicle to be raised from the ground and supported, positioned substantially wholly to one side of an upright axis of rotation for the load-carrying structure, by the load carrying structure so as to act as a counter-weight for the load-carrying structure as thus supported, means on the vehicle for turning the supported load-carrying structure, with the vehicle raised off the ground and acting as a counter-weight, about said upright axis, and adjustable levelling means to ensure that said upright axis is vertical.

2. Apparatus comprising a tower crane form load-carrying structure, a load carried thereby, a vehicle which is adapted to carry the load-carrying structure for the purpose of travel, said vehicle being raised off the ground, being carried by the load-carrying structure, being positioned substantially wholly to one side of an upright axis of rotation for the latter, and acting as a counter-weight for the load-carrying structure and means for turning the load-carrying structure, the vehicle and the load about said upright axis, whilst both the vehicle and the load are carried by the load-carrying structure and are clear of the ground, and adjustable levelling means to ensure that said upright axis is vertical.

3. Apparatus as claimed in claim 1, wherein said vehicle is a tractor.

4. Apparatus as claimed in claim 2, wherein said vehicle is a tractor.

5. Apparatus as claimed in claim 1, further comprising a winch on said tower crane form load-carrying structure for raising and lowering a load to be carried by the tower crane form load-carrying structure, an engine in the tractor, means for connecting said engine to said winch to enable said engine to drive said winch and means for connecting said engine to said means for turning the tower crane form load-carrying structure about a vertical axis to permit said engine to drive the latter said means.

6. Apparatus as claimed in claim 2, further comprising a winch on said tower crane form load-carrying structure for raising and lowering said load, an engine in the tractor, means connecting said engine to said winch to enable said engine to drive said winch, and means connecting said engine to said means for turning the tower crane form load-carrying structure about a vertical axis to permit said engine to drive the latter said means.

References Cited

UNITED STATES PATENTS

| | | |
|---|---|---|
| 2,207,053 | 7/1940 | Fivecoat et al. |
| 2,411,498 | 11/1946 | Billings _____ 214—138 |
| 3,190,457 | 6/1965 | Linden _____ 212—49 X |
| 3,253,724 | 5/1966 | Marner _____ 214—138 |

HUGO O. SCHULZ, *Primary Examiner.*